United States Patent [19]

Deary

[11] Patent Number: 5,525,105

[45] Date of Patent: Jun. 11, 1996

[54] SMOKE REMOVAL VENT FOR VEHICLE WINDOW

[76] Inventor: Reynaldo M. Deary, 1224 Turtle Creek Dr., Brownsville, Tex. 78520

[21] Appl. No.: 360,615

[22] Filed: Dec. 21, 1994

[51] Int. Cl.⁶ ............................................. B60H 1/26
[52] U.S. Cl. .......................................... 454/131
[58] Field of Search ............................ 454/131, 132, 454/133, 135

[56] References Cited

U.S. PATENT DOCUMENTS

| | | |
|---|---|---|
| 1,741,502 | 12/1929 | Crowell . |
| 2,034,528 | 3/1936 | Oakes . |
| 2,919,638 | 1/1960 | Mathews ................... 454/133 |
| 3,434,408 | 3/1969 | Rivers et al. ............... 454/132 |
| 3,866,524 | 2/1975 | Forbes, Jr. ................. 454/131 |
| 4,799,422 | 1/1989 | Birt .......................... 454/131 |
| 4,893,550 | 1/1990 | Cheng ...................... 454/131 X |
| 5,014,607 | 5/1991 | Johnson ..................... 454/131 |
| 5,284,377 | 2/1994 | Krenciprock ............... 454/131 X |

FOREIGN PATENT DOCUMENTS

| | | | |
|---|---|---|---|
| 2829241 | 1/1980 | Germany ................... 454/131 |
| 668608 | 3/1952 | United Kingdom ........ 454/131 |

*Primary Examiner*—Harold Joyce
*Attorney, Agent, or Firm*—Richard C. Litman

[57] ABSTRACT

A Y-shaped apparatus interposed between an indexable glass edge of a vehicle and the glass run designed to receive the glass edge to promote vehicle ventilation and discourage high velocity air influxes which are common to opened vehicle windows while the vehicle is in motion.

10 Claims, 2 Drawing Sheets

SMOKE REMOVAL VENT FOR VEHICLE WINDOW

BACKGROUND OF THE INVENTION

1. Field of the Invention

This invention relates to vehicle ventilation apparatuses, specifically, apparatuses which may be interposed between indexable vehicle glass and the glass run designed to receive the glass edge.

2. Description of the Prior Art

Motor vehicles typically contain window openings which are completely sealable by one-piece indexable glass. Ventilation of the passenger compartment requires indexing the glass down which creates a gap along the entire glass edge between the glass edge and the glass run designed to receive the glass edge. An unfortunate drawback of this configuration is that rather than being able to only draw stale or smokey air from the passenger compartment of the vehicle by means of the vacuum phenomenon at the forward edge of the window created by a venturi effect typical to forward-moving vehicles, the vehicle occupants must also endure high velocity air streams which enter through the rear portion of the window.

Some inventions have attempted to promote vehicle ventilation while limiting the air influx problem, but none as successfully as the present invention.

U.S. Pat. No. 1,741,502 issued Dec. 31, 1929 to W. D. Crowell describes a vehicle ventilation invention comprising either: (1) a glass extension which is received by a complementary pocket in the window frame; or (2) a window frame extension which covers only the rearmost section of glass, the glass having a uniform edge. The invention promotes an opening at the forward edge which a vacuum effect and discourages a rearward air influx so long as the glass is not indexed beyond the bounds of the aforementioned extensions. Crowell's invention is integral to the vehicle, not an attachment readily installable in conventional vehicle indexable glass systems. The size of the opening Crowell's invention promotes is variable, unlike in the present invention.

U.S. Pat. No. 2,034,528 issued Mar. 17, 1936 to G. C. Oakes describes a vehicle ventilation invention comprising an inverted U-shaped channel adhesively mounted to the window frame, in effect creating a local frame extension. Similar to Crowell's invention, the forward opening is created by indexing the glass down an amount insufficient to reveal the portion of the window covered by the adhered frame extensions. Although Oakes' invention is intended to be readily incorporated into conventional vehicle indexable glass systems, the user is required to supplant the glass run with the invention in order to install it. The present invention inserts in the glass run and on the glass edge without modification.

U.S. Pat. No. 5,014,607 issued May 14, 1991 to M. K. Johnson describes a vehicle ventilation device comprising an inverted U-shaped member which readily attaches to the glass edge and is received by the glass run. Johnson's invention is held in place by suction cups or magnets, whereas the present invention employs a more robust locating means by placing the glass edge in contact with a solid panel which abuts the glass run. Solid attachment of the invention discourages chattering which may be excited by high velocity air streams.

U.S. Pat. No. 5,284,377 issued Feb. 8, 1994 to R. C. Krenciprock describes a vehicle ventilation device comprising a solid inverted Y-shaped member which extends along the entire side glass edge creating no opening between the glass edge and run. Krenciprock's invention includes two transversely mounted, cylindrical, vented protrusions for removing cigarette ashes. First, Krenciprock's invention provides negligible ventilation except locally within the transverse protrusions. Second, the device fails the universal adaptability test because its shape would have to be tailored to fit every type of vehicle window shape on the market unlike the present invention.

German Patent No. DT-2829-241 published Jan. 17, 1980 and issued to O. Fleck describes a vehicle ventilation device comprising a U-shaped channel which mounts within the window frame, much like Oakes' invention, and includes a baffle at the forward edge. The baffle creates a sight obstruction which may render the operator and passengers vulnerable to severe injury from inability to observe potential dangers. Also, like Crowell's and Oakes' inventions, Fleck's invention encourages the ventilating vacuum effect of an opened forward portion while shielding an air influx by indexing the glass down an amount insufficient to reveal the portion of the window within the channel.

British Patent No. 668,608 published Mar. 19, 1952 and issued to G. H. Le Grys describes a vehicle ventilation device comprising four sections that fold onto each other. All of the sections are topped with an inverted U-shaped bracket. The first section has a flap which extends downward over either the outer or inner glass edge, and from the front edge of the flap rearward a significant portion of the length of the flap abutting a U-shaped bracket clamped onto the lower edge of the shorter portion of the flap. The fourth section is a mirror image of the first section. The second and third sections have flaps which extend the entire length of their respective sections. When installed, the flaps alternate hanging over the inner then outer glass edges. The present design does not fold and has a continuous lip which extends over the entire glass edge which promotes a better seal than Le Grys' invention.

None of the above references, taken alone or in combination, are seen as teaching or suggesting the presently claimed smoke removal vent for window.

SUMMARY OF THE INVENTION

The present invention relates to a vehicle ventilation apparatus. The invention is interposed between an indexable glass edge and the glass run designed to receive the glass edge. The invention comprises an upper panel and a pair of lower panels which may be fixed relative each other by fasteners of any type, preferably rivets, to form an inverted Y-shaped device. The yoke segment of the Y, which may have a nappy finish or have adhered to it a nappy material, receives the glass edge and the stem segment of the Y, which may have a nappy finish or have adhered to it a nappy material, inserts into the glass run designed to receive the glass edge. The panels may be formed from a flexible material to promote ready adaptability to a variety of vehicles.

Once the present invention is installed at the rearmost section of the window in the vehicle, while the vehicle is proceeding forward, a venturi effect encourages a vacuum phenomenon at the forward opening which draws stale or smokey air from the vehicle. Because the device covers the rear portion of the window opening, high velocity air influxes are avoided.

In consideration of the above, an object of the invention is to provide a device to promote vehicle ventilation while discouraging high velocity air influxes.

Another object of the invention is to provide a vehicle ventilation device which is readily adaptable to a variety of vehicles.

Yet another object of the invention to provide improved elements and arrangements thereof in an apparatus for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
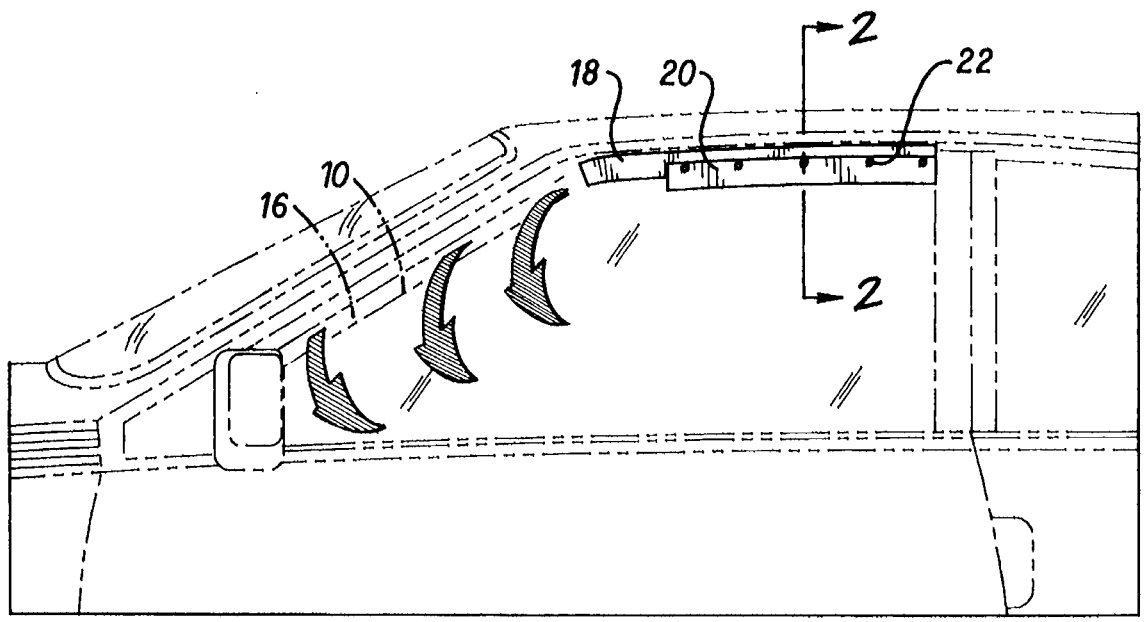
FIG. 1 is an environmental, side elevational view showing an embodiment of the invention interposed an indexable glass edge and run.

Referring to FIG. 1, the invention is shown installed in a vehicle having been interposed between an indexable glass edge 10 and the glass run 12 retained in the window frame 14 (see FIG. 1). Ordinarily, the glass run 12 receives the glass edge 10. Owing to the flexibility of the panel materials, the invention is capable of assuming different compound curvatures thus facilitating ready adaptability in a variety of vehicle indexing glass system configurations.

Once installed, when the vehicle moves forward, the invention discourages high velocity air influxes which tend to enter the rear portion of the window opening and encourages ventilation of the vehicle by taking advantage of the vacuum phenomenon at the vent opening 16 created by a venturi effect caused by air streams passing across the vehicle window frame 14 near the vent opening 16. The vacuum phenomenon draws stale or smokey air from the vehicle.

Figure 2:
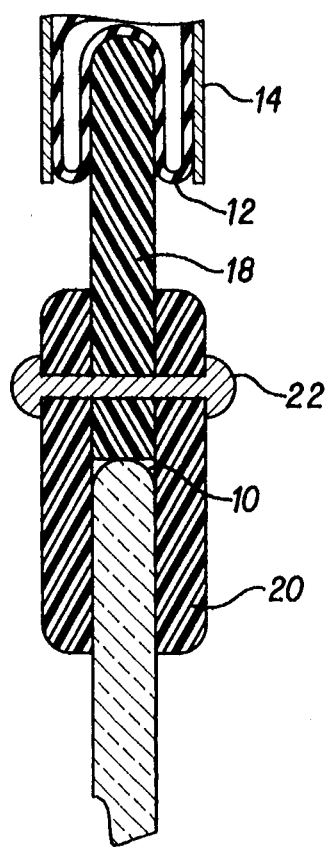
FIG. 2 is a cross sectional of a first embodiment view taken along lines 2—2 of FIG. 1, and drawn to an enlarged scale.
Figure 3:
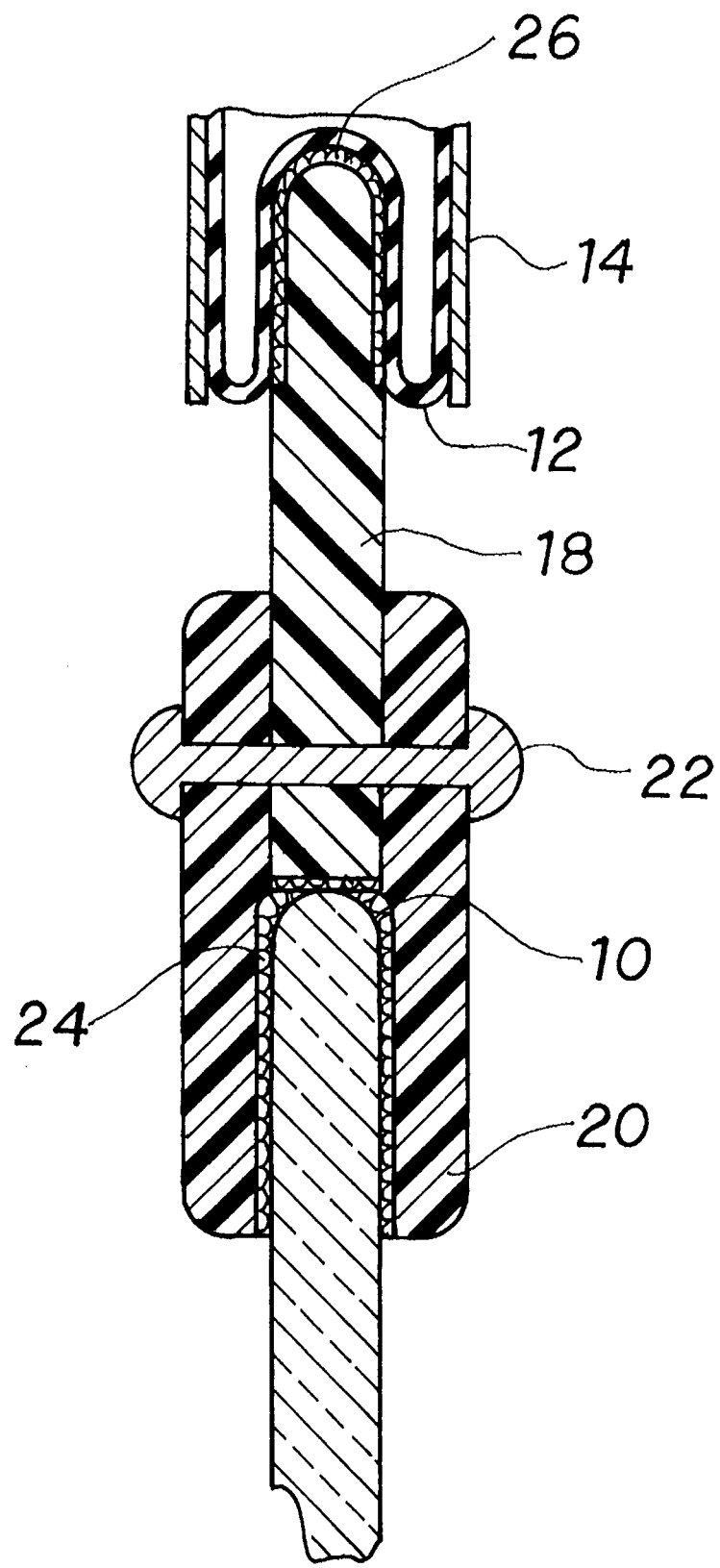
FIG. 3 is a cross sectional view of a second embodiment taken along lines 2—2 of FIG. 1, and drawn to an enlarged scale.

FIG. 2 shows a cross section of the invention as installed. The invention includes an upper panel 18 which may have a nappy finish or have adhered to it a nappy material defining a nappy surface 26, as shown in FIG. 3, local to the region of the upper panel 18 received by the glass run 12 to promote better sealing with the glass run 12. The length of the upper panel 18 is less than the length of the upper edge of conventional vehicle indexable glass. The thickness of the upper panel 18 is substantially equal to or greater than the thickness of conventional vehicle indexable glass. The height of the upper panel 18 is less than the width of a conventional vehicle window frame 14.

The invention also includes a pair of lower panels 20. The length of the lower panels is preferably, but not limited to, less than the length of the upper panel 18. The thickness of the lower panels 20 may be the same as the upper panel thickness to reduce manufacturing complexity, but need only be sufficient enough to overcome loads created by wind gusts against the installed apparatus. The height of the lower panels 20 is also not critical, however should permit a sufficient amount of the upper panel 18 to insert fully into the glass run 12 and not obstruct vision.

The upper inside regions of these lower panels 20 are secured to the outside lower regions of the upper panel 18 by fasteners 22, for example, rivets or threaded fasteners, which pass through collinear holes in the upper panel 18 and lower panels 20. The lower inside regions of the lower panels 20 and the lower edge of the upper panel 18 form a groove which receives the glass edge. Since the groove width is defined by the upper panel thickness which is substantially equal to or greater than the glass thickness, the apparatus should fit snugly over the glass edge 10 and be frictionally secured thereon. Additionally, the panel surfaces within the groove may have a nappy finish or may have adhered to them a nappy material defining a nappy groove lining 24, as shown in FIG. 3, to promote better sealing with the glass edge 10.

The invention may also include a stem (not shown) located on the upper panel 18 and/or lower panels 20 to facilitate installation of the device.

The present invention is not intended to be limited to the sole embodiment described above, but to encompass any and all embodiments within the scope of the following claims.

I claim:

1. An apparatus to promote vehicle ventilation which attaches to vehicle window openings of a plurality of vehicle indexing glass system configurations, the openings defined by a door frame having a window opening, a glass run, having compound curvatures, having a channel for receiving indexable vehicle glass disposed about the window opening in the frame, and a glass edge having compound curvatures, said ventilation apparatus comprising:

an upper panel having a length less than the upper glass edge length, a thickness at least equal to the glass thickness, a lower and an upper edge and a first and a second surface, each surface having a lower and an upper region;

wherein said upper edge and said upper regions of said upper panel are received by the glass run channel;

a pair of lower panels each having an inner and an outer surface, each surface of the lower panels having a lower and an upper region;

wherein said lower panels each have said upper region of said inner surface in contact with said lower region of said first or second surface of said upper panel thereby forming a groove described by said lower regions of said inner surfaces of said lower panels and said lower edge of said upper panel;

wherein said groove receives the glass edge; and wherein said upper and lower panels are formed of flexible materials such that said apparatus assumes different compound curvatures to conform to said glass run and said glass edge of each of said plurality of vehicle indexing glass system configurations.

2. An apparatus to promote vehicle ventilation as recited in claim 1, wherein said upper regions of said first and second surfaces of said upper panel include a nap-like finish.

3. An apparatus to promote vehicle ventilation as recited in claim 1, wherein a nappy material is adhered to said upper regions of said first and second surfaces of said upper panel.

4. An apparatus to promote vehicle ventilation as recited in claim 1, wherein said lower regions of said inner surfaces of said lower panels and said lower edge of said upper panel forming said groove include a nap-like finish.

5. An apparatus to promote vehicle ventilation as recited in claim 1, wherein a nappy material is adhered within said groove.

6. An apparatus to promote vehicle ventilation as recited in claim 1, wherein said upper and lower panels are fixed relative each other.

7. An apparatus to promote vehicle ventilation as recited in claim 6, wherein said upper panel has means defining a plurality of openings, each having a central axis transverse to the glass edge disposed along said lower region of said outer surface of said upper panel, said lower panels each having a like number of similarly sized openings as disposed within said upper panel, and each having central axes collinear with said openings in said upper panel, and disposed along said upper region interposed between said inner and outer surfaces of said lower panel, and a like number of fasteners as openings disposed within said upper and lower panels, said fasteners being disposed within said openings, thus to clamp together said lower and upper panels.

8. An apparatus to promote vehicle ventilation as recited in claim 7, wherein said fasteners are rivets.

9. An apparatus to promote vehicle ventilation which attaches to vehicle window openings, the openings defined by a door frame having a window opening, a glass run, having a channel for receiving indexable vehicle glass disposed about the window opening in the frame, and a glass edge, said ventilation apparatus comprising:

an upper panel having a length less than the upper glass edge length, a thickness at least equal to the glass thickness, a lower and an upper edge and a first and a second surface, each surface having a lower and an upper region;

wherein said upper edge and said upper regions of said upper panel have a nappy surface, and are received by the glass run channel;

a pair of lower panels each having an inner and an outer surface, each surface of the lower panels having a lower and an upper region;

wherein said lower panels each have said upper region of said inner surface in contact with said lower region of said first or second surface of said upper panel thereby forming a groove described by said lower regions of said inner surfaces of said lower panels and said lower edge of said upper panel;

wherein said groove receives the glass edge and includes a nappy groove lining.

10. An apparatus to promote vehicle ventilation as recited in claim 9, wherein said upper and lower panels are formed from flexible material to promote ready adaptability in various vehicle indexable glass system configurations.

* * * * *